(12) United States Patent
Kawanabe

(10) Patent No.: US 8,143,562 B2
(45) Date of Patent: Mar. 27, 2012

(54) AUTOFOCUS DEVICE ENABLING REAL-TIME FOLLOW-AF, METHOD OF CONTROLLING THE SAME, AND MICROSCOPE SYSTEM USING THE SAME

(75) Inventor: Hideyuki Kawanabe, Tokyo (JP)

(73) Assignee: Olympus Corporation, Tokyo (JP)

( * ) Notice: Subject to any disclaimer, the term of this patent is extended or adjusted under 35 U.S.C. 154(b) by 681 days.

(21) Appl. No.: 11/983,656

(22) Filed: Nov. 9, 2007

(65) Prior Publication Data

US 2008/0111911 A1    May 15, 2008

(30) Foreign Application Priority Data

Nov. 15, 2006    (JP) .................................. 2006-309272

(51) Int. Cl.
G02B 7/04 (2006.01)
G02B 27/40 (2006.01)
G02B 27/64 (2006.01)

(52) U.S. Cl. .................. 250/201.2; 250/201.3; 359/368; 359/389; 359/698; 348/80

(58) Field of Classification Search .... 250/201.1–201.4; 359/385, 388, 389, 390, 381, 368, 694, 695, 359/698; 348/79, 80, 353, 351
See application file for complete search history.

(56) References Cited

U.S. PATENT DOCUMENTS

| 4,766,302 | A | * | 8/1988 | Ishida et al. | ............... 250/201.8 |
| 5,212,513 | A | * | 5/1993 | Ishida et al. | ................... 396/104 |
| 5,483,079 | A | * | 1/1996 | Yonezawa | ................ 250/559.29 |
| 2004/0112535 | A1 | * | 6/2004 | Fujimoto et al. | ......... 156/345.24 |
| 2004/0113043 | A1 | * | 6/2004 | Ishikawa et al. | ............ 250/201.4 |
| 2004/0114224 | A1 | * | 6/2004 | Rigler et al. | ................... 359/383 |
| 2004/0196550 | A1 | * | 10/2004 | Shimizu et al. | ............... 359/388 |

FOREIGN PATENT DOCUMENTS

| JP | 8-190045 A | 7/1996 |
| JP | 2001-296467 A | 10/2001 |
| JP | 2002-341234 A | 11/2002 |
| JP | 2003-344782 A | 12/2003 |

* cited by examiner

*Primary Examiner* — Francis M Legasse, Jr.
(74) *Attorney, Agent, or Firm* — Holtz, Holtz, Goodman & Chick, PC

(57) ABSTRACT

An autofocus device, comprises: a stage for mounting a sample; an objective lens; a focusing unit driving stage or the objective lens in an optical axis direction in order to control the position relative to each other of the stage and the objective lens; a lighting unit onto the sample; a detection unit detecting an optical image; a projection state changing unit being provided in an optical path, changing a state of the optical image projected onto the detection unit; a first in-focus state determination unit determining an in-focus state of the sample on the basis of a detection result; and a first in-focus state adjustment unit controlling a position of the projection state changing unit such that a state in which the stage and the objective lens are held at prescribed positions under control of the driving unit is determined to be an in-focus state.

9 Claims, 16 Drawing Sheets

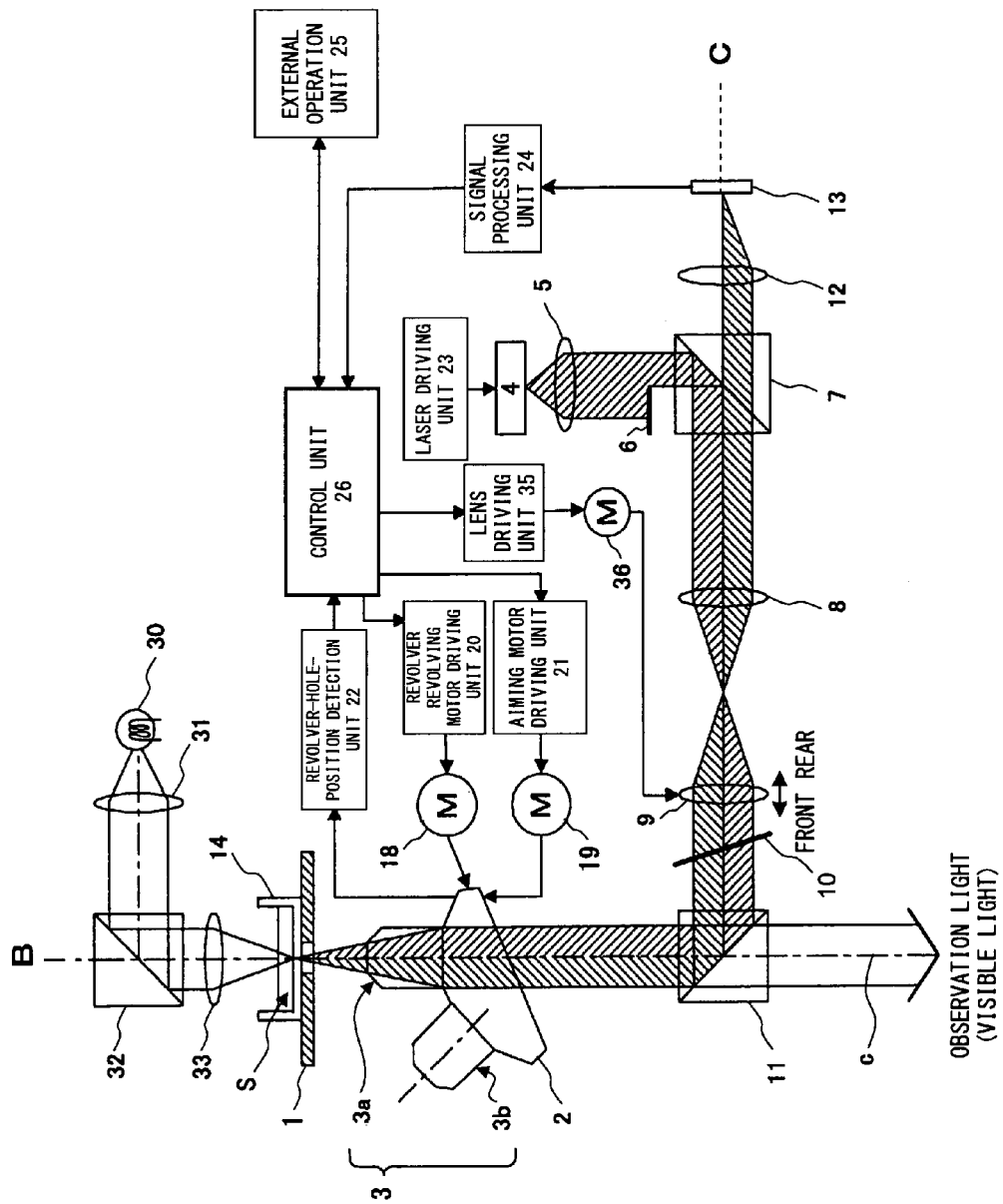
F I G. 2

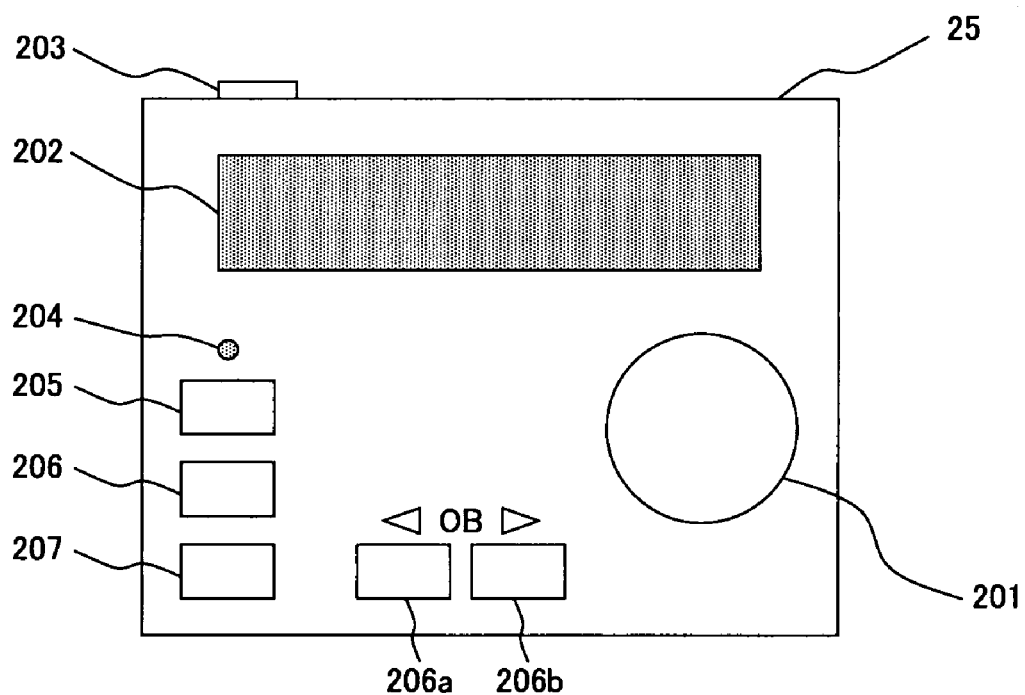
F I G. 3

PRIOR ART

REAR FOCUS POSITION

IN-FOCUS POSITION

FRONT FOCUS POSITION

PRIOR ART

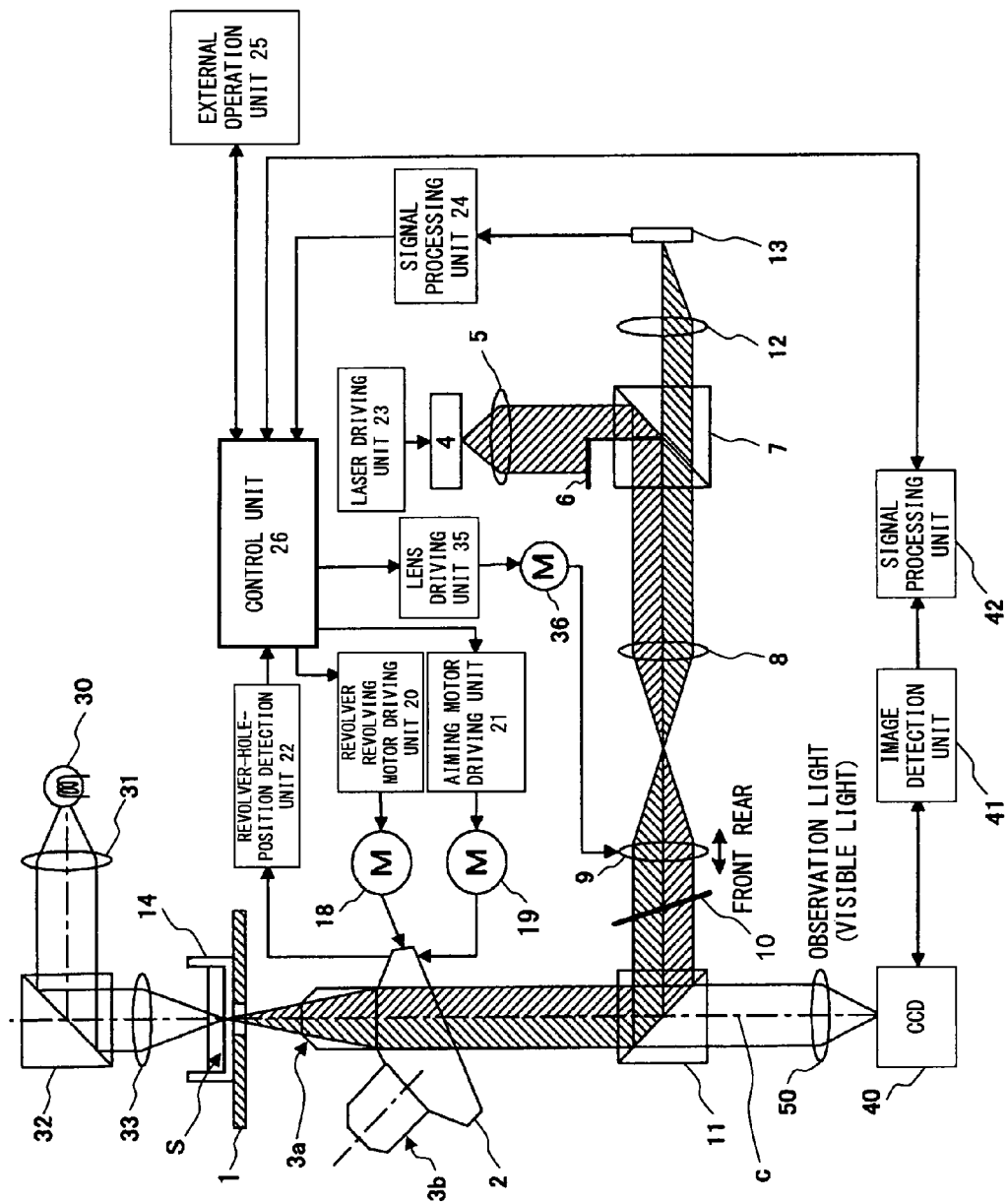
F I G. 14

AUTOFOCUS DEVICE ENABLING REAL-TIME FOLLOW-AF, METHOD OF CONTROLLING THE SAME, AND MICROSCOPE SYSTEM USING THE SAME

CROSS REFERENCE TO RELATED APPLICATION

This application is based on and claims the benefit of priority from the prior Japanese Patent Application No. 2006-309272 filed in Japan on Nov. 15, 2006, the entire contents of which are incorporated by this reference.

BACKGROUND OF THE INVENTION

1. Field of the Invention

The present invention relates to an autofocus device used in optical instruments such as microscopes.

2. Description of the Related Art

In recent years, the use of optical instruments such as microscopes that employ autofocus (hereinafter, referred to as "AF") techniques has been wide-spread. Particularly, the follow-AF function is commonly included in microscopes, by which proper focus is continuously maintained in the position that has to be the in-focus position by using the AF technique in order to achieve a high efficiency in observation of samples.

When, for example, reactions to the dosage of reagent to cells are observed in the conventional method, the in-focus position that has been achieved sometimes gets shifted due to vibration, distortion, or the like of vessels caused by the dosage. Even in such cases, microscopes can continuously maintain focus on the in-focus position if they have the follow-AF function.

However, because of some of the characteristics of microscopes, there are some difficulties in having the AF techniques applied to them. One of the problems occurs when the position on which proper focus is being achieved by the AF and the position that the observer is actually paying attention to are different on the sample.

In particular, in the case of a microscope using an objective lens with a high numerical aperture to achieve a high magnification, the focus depth of the objective lens is small, on the order of sub microns, while even the thinnest cell adopted as a sample has a thickness of several micrometers. Accordingly, it often occurs that the in-focus position fixed by the AF function and the position of the observation target that the observer is paying attention to on the sample are not the same.

In order to cope with this, a device is provided, as a conventional technique, in which the in-focus position can be changed by applying an offset, which can be done by using the AF without cancelling the AF in the case when the focus is manually adjusted during the AF operation. (For example, Japanese Patent Application Publication No. 2001-296467) The concept of this offset operation in the AF function is explained in FIG. 1.

FIG. 1 shows the principle of the conventional AF. An optical image of a sample 143 mounted on a stage 144 is formed into an image by an image forming lens 141 via an objective lens 140, and is picked up by an AF sensor 142; thereby visual observation is allowed from an observation position X.

By moving the sample 143 together with the stage 144 upward and downward in this configuration, the in-focus image of the sample 143 is projected onto the AF sensor 142. When parfocality is achieved between the AF sensor 142 and the observation position X by performing the AF operation, an in-focus image of the sample 143 can be observed from the observation position X.

In this configuration, the AF sensor 142 is moved in the direction of "a1" in the figure, and an offset is applied to the parfocality between the observation position X and the AF sensor 142. Then, the light image of the sample 143 projected onto the AF sensor 142 is defocused.

Thus, in order to obtain a projection of the in-focus image on the AF sensor 142 by using the AF control, the stage 144 is moved in the direction of "a2" in the figure. At this moment, the observation position X has not moved, and thus an out-of-focus image of the lower side of the sample 143 is to be observed from the observation position X.

When the AF sensor 142 is moved in the direction of "b1", the stage 144 is moved in the direction of "b2" in a similar operation as above. Then, an out-of-focus image of the upper side of the sample 143 is to be observed from the observation position X.

By utilizing the above phenomena, a so-called offset function of the AF is achieved in which it is possible to obtain an in-focus image of respective layers at different heights in the sample 143 of, for example, a multilayer configuration, by performing the AF control from arbitrarily changed positions.

Thereby, even when the position on the sample 143 on which proper focus is being achieved by the AF and the position to which the observer is actually paying attention are different from each other, proper focus can be achieved on the position to which attention is being given by the observer by applying an offset.

Japanese Patent Application Publication No. 2002-341234 discloses an AF device for a microscope in which the initial adjustment error between the active and passive AFs is reduced in the hybrid AF. According to the technique of Japanese Patent Application Publication No. 2002-341234, the adjustments of the active and passive AFs that were separately performed in conventional methods are performed in such a manner that after adjustment of the passive AF, the initial adjustment of the active AF is performed while monitoring the focusing state in the adjusted passive AF. Thereby, focal shifts between the active and passive AFs that are due to the lack of adjustment and mistakes in adjustment are reduced.

SUMMARY OF THE INVENTION

An autofocus device according to the present invention, comprises:

a stage for mounting a sample;

an objective lens arranged opposite to the sample mounted on the stage;

a focusing unit for driving at least one of the stage and the objective lens in an optical axis direction in order to control the position relative to each other of the stage and the objective lens;

a lighting unit for casting, light for focusing, onto the sample via the objective lens;

a detection unit for detecting an optical image formed by light that was cast by the lighting unit and was reflected from the sample via the objective lens;

a projection state changing unit being provided in an optical path from the lighting unit to the detection unit, for changing a state of the optical image projected onto the detection unit;

a first in-focus state determination unit for determining an in-focus state of the sample on the basis of a detection result obtained from the detection unit; and a first in-focus state adjustment unit for controlling a position of the projection state changing unit such that a state in which the stage and the objective lens are held at prescribed positions under control of the driving unit is determined to be an in-focus state by the first in-focus state determination unit.

In a method of controlling an autofocus device, according to the present invention, comprises:

a step of achieving focus on an observation position of a sample by changing a relative distance between a stage mounting the sample and an objective lens arranged opposite to the sample mounted on the stage;

a step of changing a state of an optical image projected on a detection unit by controlling a projection state changing unit being provided in an optical path from the lighting unit to the detection unit;

a step of changing a state of the optical image projected onto the detection unit;

a step of determining a projection state of the optical image;

a step of detecting an in-focus state with respect to the sample while the projection state is maintained; and a step of performing a following operation with respect to an observation position on the sample while adjusting the relative distance in accordance with a detected in-focus state.

BRIEF DESCRIPTION OF THE DRAWINGS

FIG. 2 shows the entire configuration of an AF device for microscopes in the first embodiment;

FIG. 3 shows an external operation unit 25 in the first embodiment;

FIG. 14 shows the entire configuration of an AF device for a microscopes in the second embodiment;

Figure 1:
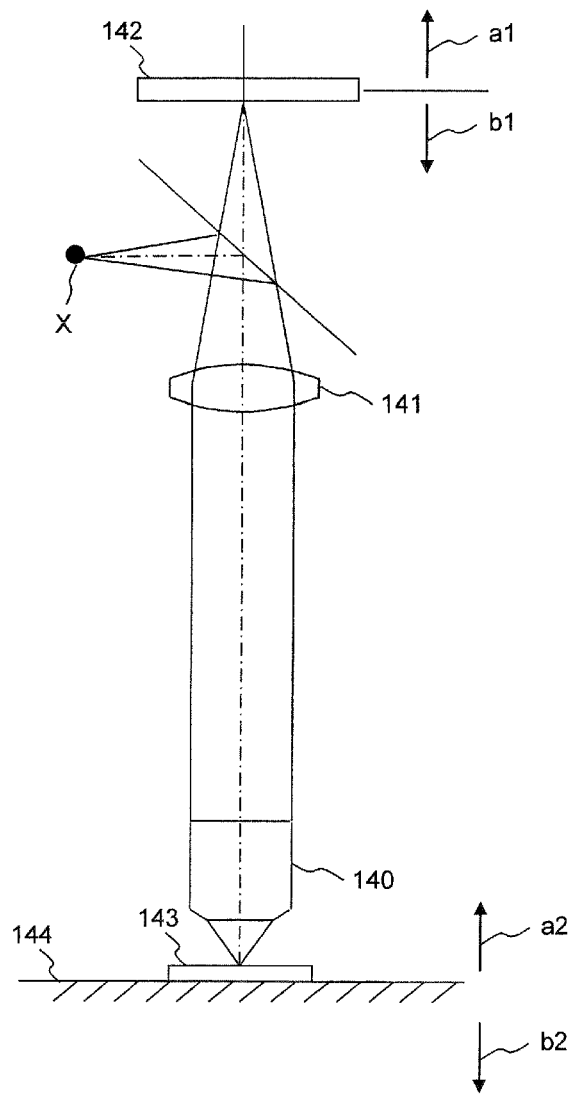
FIG. 1 shows the principle of the conventional AF.

DESCRIPTION OF THE PREFERRED
EMBODIMENTS

In the method of Japanese Patent Application Publication No. 2001-296467, in which an offset is applied to the AF, the user has to manually adjust the offset to the point of interest after performing the AF. In other words, the user has to adjust focus on the position of interest after the execution of the AF, which results in increased complications in operations.

Also, in the hybrid AF disclosed in Japanese Patent Application Publication No. 2002-341234, if the user tries to set an in-focus position suitable for the observation, the passive AF is to be adjusted, which greatly increases complications in operations. Also, because two AF functions are mounted, the device inherently becomes complicated and large.

In the embodiments of the present invention explained below, an AF device is provided in which the real-time follow-AF to the position of interest is realized only by setting (by the user) of the in-focus position at which the user wants to make an observation.

An AF device according to the present invention is an AF device used for a microscope in which the position relative to each other of a stage for mounting a sample and an objective lens arranged opposite to the sample mounted on the stage can be changed.

The AF device comprises a driving unit, a light casting unit, a detection unit, a projection state changing unit, a first in-focus state determination unit, and a first in-focus state adjustment unit.

The driving unit drives an objective lens arranged so that it is opposite to the sample on the stage, and drives at least one of the stage and the objective lens in the optical axis direction in order to control the position relative to each other of the stage and the objective lens (the driving unit corresponds to, for example, an aiming motor 19 and an aiming motor driving unit 21 in the embodiments described below).

The light casting unit casts light onto the sample via the objective lens (the light casting unit corresponds to, for example, a reference light source 4 in the embodiments below). The detection unit detects the optical image formed by the light that was cast by the light casting unit and that was reflected from the sample via the objective lens. (The detection unit corresponds to, for example, a light receiving sensor 13 in the embodiments below).

The projection state changing unit is provided in an optical path from the light casting unit to the detection unit, and changes the state of the optical image projected onto the detection unit (the projection state changing unit corresponds to, for example, an offset lens group 9 in the embodiments below).

The first in-focus state determination unit determines the in-focus state of the sample on the basis of the detection result obtained from the detection unit (the first in-focus state determination unit corresponds to, for example, a control unit 26 in the embodiments below).

The first in-focus state adjustment unit adjusts the position of the projection state changing unit such that the state in which the stage and the objective lens are held at prescribed positions under the control of the driving unit is determined to be the in-focus state by the first in-focus state determination unit (the first in-focus state adjustment unit corresponds to, for example, the control unit 26 in the embodiments below). The first in-focus state adjustment unit maintains the in-focus state by controlling the driving unit in the state in which the position of the projection state changing unit has been adjusted and further in the state in which the projection state changing unit has been maintained.

Due to this configuration, it is possible to realize the real-time follow-AF to the point of interest only by determining the in-focus position at which the user desires to observe the sample.

The AF device further comprises an image pick-up unit, a second in-focus state determination unit, and a second in-focus state adjustment unit. The image pick-up unit picks up observation images of the sample (the image pick-up unit corresponds to, for example, a CCD 40 in the embodiments below). The second in-focus state determination unit determines the focus state of the sample on the basis of outputs of the image pick-up unit (the second in-focus state determination unit corresponds to, for example, the control unit 26 in the examples below).

The second in-focus state adjustment unit adjusts the positions of the stage and the objective lens to positions that are determined by the second in-focus state determination unit to be the in-focus position (the second focus stage adjustment unit corresponds to, for example, the control unit 26 in the embodiments below).

Due to this configuration, it is possible to realize the accurate follow-AF to the point of interest with only one operation, instead of requiring the user to manually adjust focus to the point of interest when he or she wishes to observe the sample while maintaining focus on the in-focus position.

The AF device further comprises a storage unit and a return control unit. The storage unit stores information on the positions of the projection state changing unit (for example, the position of the offset lens when the follow-AF has been performed on the previously set in-focus position) that has been adjusted at least by the first in-focus state adjustment unit (the storage unit corresponds to, for example, a RAM 303 in the embodiments below). Additionally, the storage unit may store setting information such as the type of objective lens 3 inserted into the optical axis, the position of aiming (Z position), the quantity of luminous light, the observation methods (filter position), the XY stage position, the position of the offset lens, and the like when the instruction has been given to maintain the state of the microscope at a prescribed timing.

The return control unit causes the projection state changing unit to return on the basis of the position of the projection state changing unit stored in the storage unit (the return control unit corresponds to, for example, the control unit 26 in the embodiments below).

Due to this configuration, it is possible to perform the follow-AF control to the previously set in-focus position. Also, when the storage unit stores the type of objective lens 3 inserted into the optical axis, the position of aiming (z position), the quantity of luminous light, the observation methods (filter position), the XY stage position, the position of the offset lens, and the like, the return to the state the microscope was in when the maintenance instruction was given is realized.

In the embodiments below, an active AF device is explained as an example; in this active AF device, an infrared laser beam is cast onto the sample and the in-focus position is detected by using the light reflected from the sample. Hereinafter, in the active AF, the AF algorithm is applied to an aberration correction lens (hereinafter referred to as an offset lens) that has conventionally been used for correcting the color aberration of the infrared laser beam and the visible light (observation optical path). Then, the user controls the offset lens such that the in-focus position that the user is currently observing is detected as the in-focus position, and the real-time follow-focus to the determined position of the offset lens is realized.

First Embodiment

FIG. 2 shows the entire configuration of an AF device for microscopes according to the present embodiment. An electric revolver comprises a revolving nosepiece 2, a plurality of objective lenses 3 (3a and 3b), a revolver revolving motor 18, a revolver revolving motor driving unit 20, and a revolver-hole-position detection unit 22.

The revolving nosepiece 2 can revolve, and a plurality of the objective lenses can be attached to the revolving nosepiece 2. The revolver revolving motor driving unit 20 revolves the revolving nosepiece 2 by electrically driving the revolver revolving motor 18, and inserts an arbitrarily selected objective lens 3 into the optical path.

The revolver-hole-position detection unit 22 detects which objective lens attachment hole in the revolving nosepiece 2 is currently inserted into the optical path. In FIG. 2, the objective lens 3a has been inserted into the optical path.

The revolving nosepiece 2 is driven in accordance with the signals transmitted from a control unit 26. The control unit 26 controls the revolver revolving motor driving unit 20 in response to the signals that indicate the objective attachment hole that is currently inserted into the optical path. Then, the revolving nosepiece 2 revolves by using the power from the revolver revolving motor 18 driven by the revolver revolving motor driving unit 20.

The observation sample consists of, for example, an observation body S mounted on a glass vessel 14. The observation sample is mounted on a moving stage 1, and is observed via the objective lens 3.

The optical system for illuminating the observation sample comprises a lens group consisting of lenses 31 and 33, and a half mirror 32. This optical system condenses light cast by the light source 30 onto the lens group consisting of lenses 31 and 33. The light source 30 is a halogen lamp.

An external operation unit 25 is connected to the control unit 26. Instructions given by the user to the external operation unit 25 control the respective electrical-driving units in the constituents of the microscope.

The moving stage 1 is moved by the aiming motor 19 upward and downward along the optical axis C. The aiming motor 19 is electrically driven by the aiming motor driving unit 21.

First, an active AF optical system is explained. As the reference light source 4 for the active AF, a light source that emits light in the invisible light wavelength range such as infrared laser light or the like is used. The reference light source 4 is controlled by a laser driving unit 23. The laser driving unit 23 performs the pulse lighting of the reference light source 4, and controls the intensity of the light of the light source.

The laser beams emitted from the reference light source 4 passes through a collimating lens 5 used for keeping the beams parallel to each other, and half of the flux-of-light is cut by a light-casting-side stopper 6. Thereafter, the P-polarization components of the laser beams are reflected from the PBS 7, and are guided to the side "S" on the sample.

The flux-of-light that has been condensed by a condensing lens group 8 passes through an offset lens group 9. An offset lens driving motor 36 is controlled by the control unit 26 via the offset-lens-driving unit 35. As a result of this, the offset lens group 9 can move along the optical axis C; in other words, it can apply an offset to the in-focus position.

The beams that have passed through the offset lens group 9 are polarized by 45 degrees when passing through a λ/4 plate 10, and are incident on a dichroic mirror 11. The dichroic mirror 11 only reflects the beams in the infrared range; thus, the laser flux emitted from the reference light source 4 is reflected. The reflected flux forms, through the objective lens 3, an image having a spot-like shape on the bottom of the vessel 14 containing the observation sample S.

Then, the flux that was reflected from the observation sample S is incident on the dichroic mirror 11 via the objective lens 3. The flux that was reflected from the dichroic mirror 11 is further polarized by 45 degrees when it passes through the λ/4 plate 10 once again, and is changed into the S-polarization components.

Further, the flux passes through the offset lens group 9 and the condense lens group 8, and is incident on the PBS 7. Because the flux has become the S-polarization components, the flux is transmitted through the PBS 7, and is formed into an image on the light receiving sensor 13 after passing through a condensing lens group 12. The light receiving sensor 13 detects the laser reflection light intensity of the formed image.

The laser reflection light intensity detected by the light receiving sensor 13 is output to a signal processing unit 24. The signal processing unit 24 performs prescribed signal processing on the laser reflection light intensity, and outputs the result to the control unit 26.

FIG. 3 shows the external operation unit 25 in the present embodiment. A jog dial 201 is used to move the moving stage 1 upward and downward; in other words, the moving stage 1 is moved upward and downward in response to the turn of the jog dial.

Objective lens switching buttons 206 (206a and 206b) are used to revolve the revolving nosepiece 2. When the Objective lens switching button 206a is pressed, the revolving nosepiece 2 revolves in the clockwise direction, and when the Objective lens switching button 206b is pressed, the revolving nosepiece 2 revolves in the counterclockwise direction. Via this operation, an arbitrary objective lens can be inserted into the optical path.

A display unit 202 can be, for example, a monochrome liquid crystal display screen on which information on the objective lens currently inserted into the optical path and the states or the like of other driving units are displayed as character information.

When a "Follow-AF to current observation position" button 205 is selected, the follow-AF control is performed on the in-focus position that is currently being observed (currently displayed on the screen). When a "Follow-AF to previously set position" button 206 is selected, the follow-AF control is performed on the previously set in-focus position. When a "Cancel follow-AF" button 207 is pressed, the follow-AF that is being performed is cancelled.

When the follow-AF is being performed, an AF in-operation display unit 204 lights up. A connector 203 is for the connection to the control unit 26.

Figure 4:
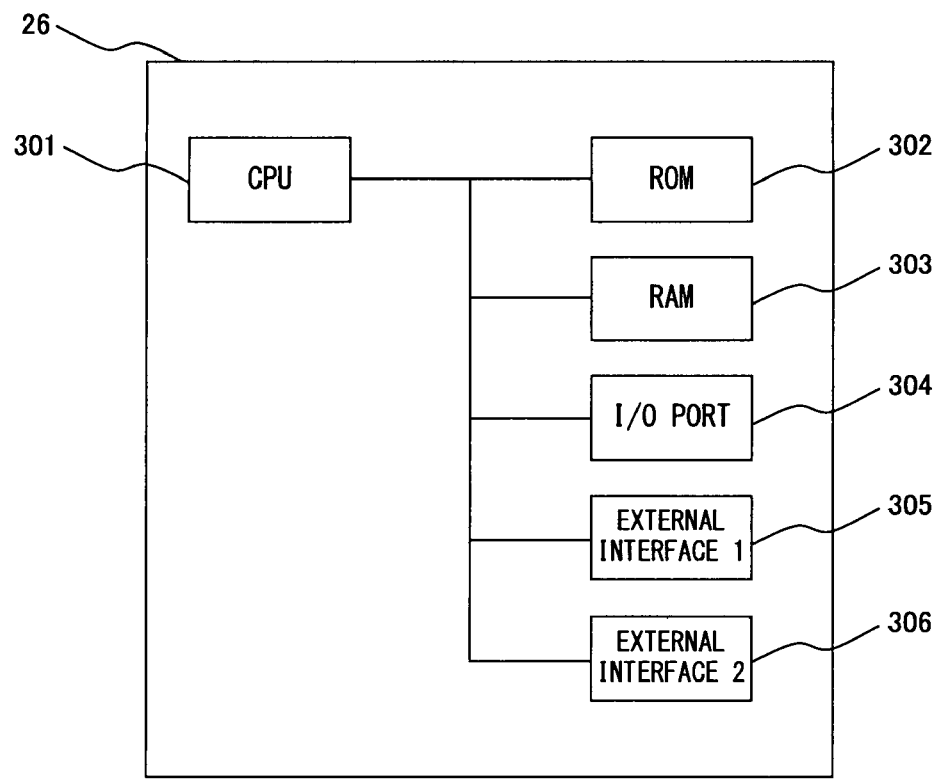
FIG. 4 shows an internal configuration of a control unit 26 in the first embodiment.

FIG. 4 shows an internal configuration of the control unit 26 in the present embodiment. ROM 302 stores a program for controlling the system. The RAM 303 is a volatile memory or the like that stores data necessary for controlling the system.

A CPU 301 reads the prescribed programs stored in the ROM 302, and executes the respective controls. An I/O port 304 is an input/output interface for allowing data exchange between the respective driving units and the signal processing unit in the microscope. External interfaces (I/F) 305 and 306 are communication interfaces allowing communications with an external operation unit 25, PCs, and the like.

FIGS. 5A through 5C and FIGS. 6A through 6C show states of image formation in the light receiving sensor 13. The way in which images are formed on the light receiving sensor 13 changes depending upon the distance between the objective lens 3 and the observation sample S. It also changes depending upon the position of the offset lens group 9.

Figure 5A:
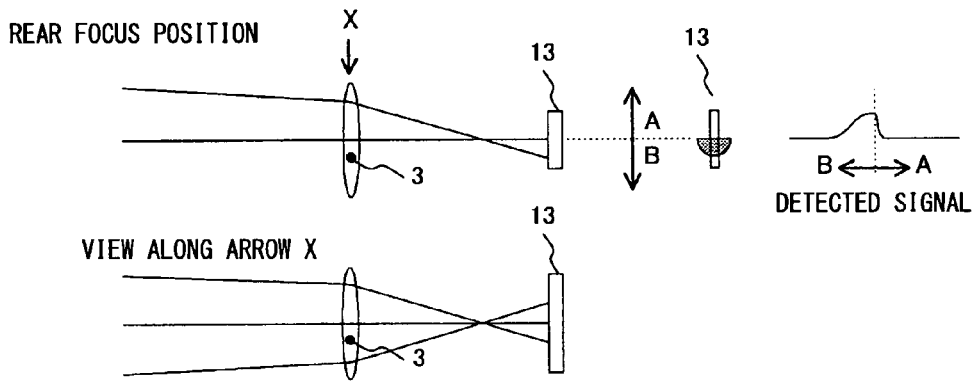
FIG. 5 respectively shows the states of image formation in a light receiving sensor 13 at different distances between an objective lens 3 and a sample 3 in the first embodiment.
Figure 5B:
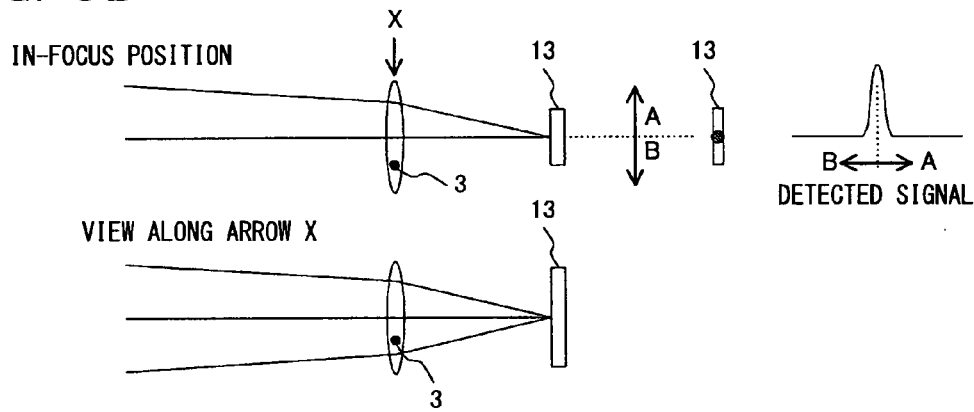
Figure 5C:
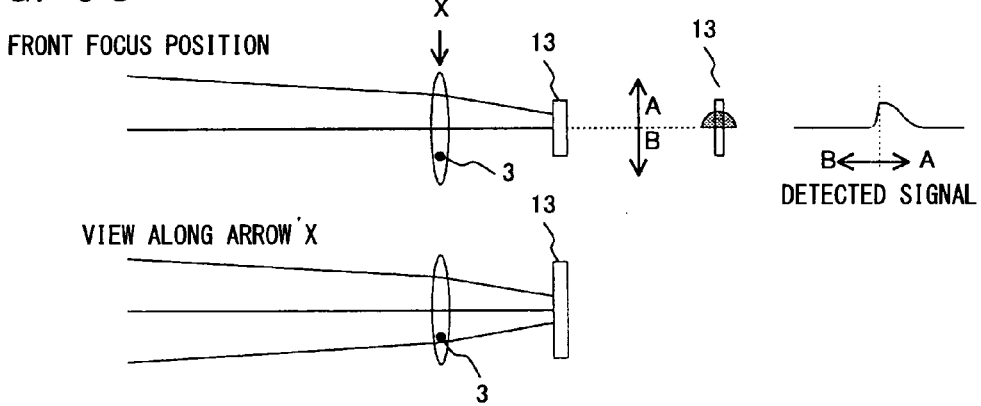

FIGS. 5A through 5C show the states when the offset lens group 9 is fixed to a certain position while the distance between the objective lens 3 and the sample S is changed; in other words, the image formation states on the objective lens 3 when the moving stage 1 is moved along the optical axis B by using the aiming motor driving unit 21 are shown.

The light receiving sensor 13 comprises a photodiode that has been split into two arranged in such a manner that the optical axis is at the middle of the photodiode. When the observation sample S is at the in-focus position, the spot light that has formed an image on the light receiving sensor 13 presents a narrow and high intensity distribution as shown in FIG. 5B.

When the observation sample S is below the in-focus position (rear focus position), the spot light that has formed an image on the light receiving sensor 13 presents the intensity distribution as shown in FIG. 5A.

When the observation sample S is above the in-focus position (front focus position), the spot light that has formed an image on the light receiving sensor 13 presents the intensity distribution as shown in FIG. 5C.

Then, the spot light that has formed an image on the light receiving sensor 13 is converted into the detection signals shown in the respective figures.

Figure 6A:
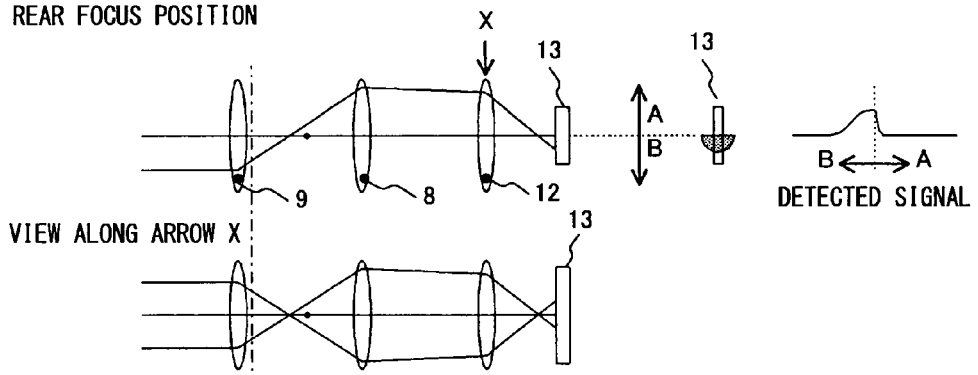
FIG. 6 respectively shows the states of image formation in the light receiving sensor 13 at different positions of the offset lens group 9 in the first embodiment.
Figure 6B:
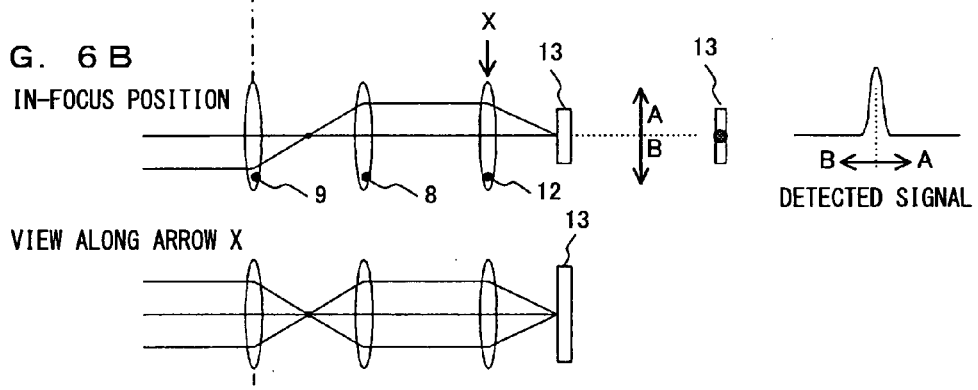
Figure 6C:
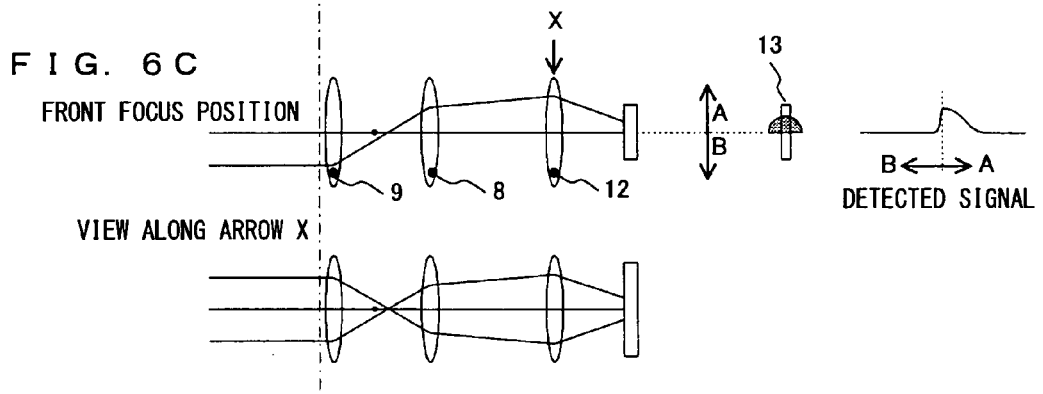

FIGS. 6A through 6C show the states when the moving stage 1 is fixed to a certain position along the optical axis B while the offset lens group 9 is moved.

As the distance between the objective lens 3 and the observation sample S is fixed, the fluxes incident on the offset lens group 9 (the left flux of the offset lens group 9 in the figures) are the same as those shown in FIG. 6A through 6C.

FIG. 6B shows the state that is determined to be in-focus from the output of the light receiving sensor 13, and the narrow and high intensity distribution is shown similarly as in FIG. 5B.

When the offset lens group 9 is moved to the left from the state in FIG. 6B, the image forming state as shown in FIG. 6A is established. In this case, a sensor's output similar to the one obtained from the position shown in FIG. 5A is obtained.

When the offset lens group 9 is moved to the right in the figure, the image forming state as shown in FIG. 6C is established. In this case, a sensor's output similar to the one obtained from the position shown in FIG. 5C is obtained.

As described above, even when the distance between the objective lens 3 and the observation sample S is constant, the image forming state on the light receiving sensor 13 changes in accordance with the position of the offset lens group 9.

Figure 7:
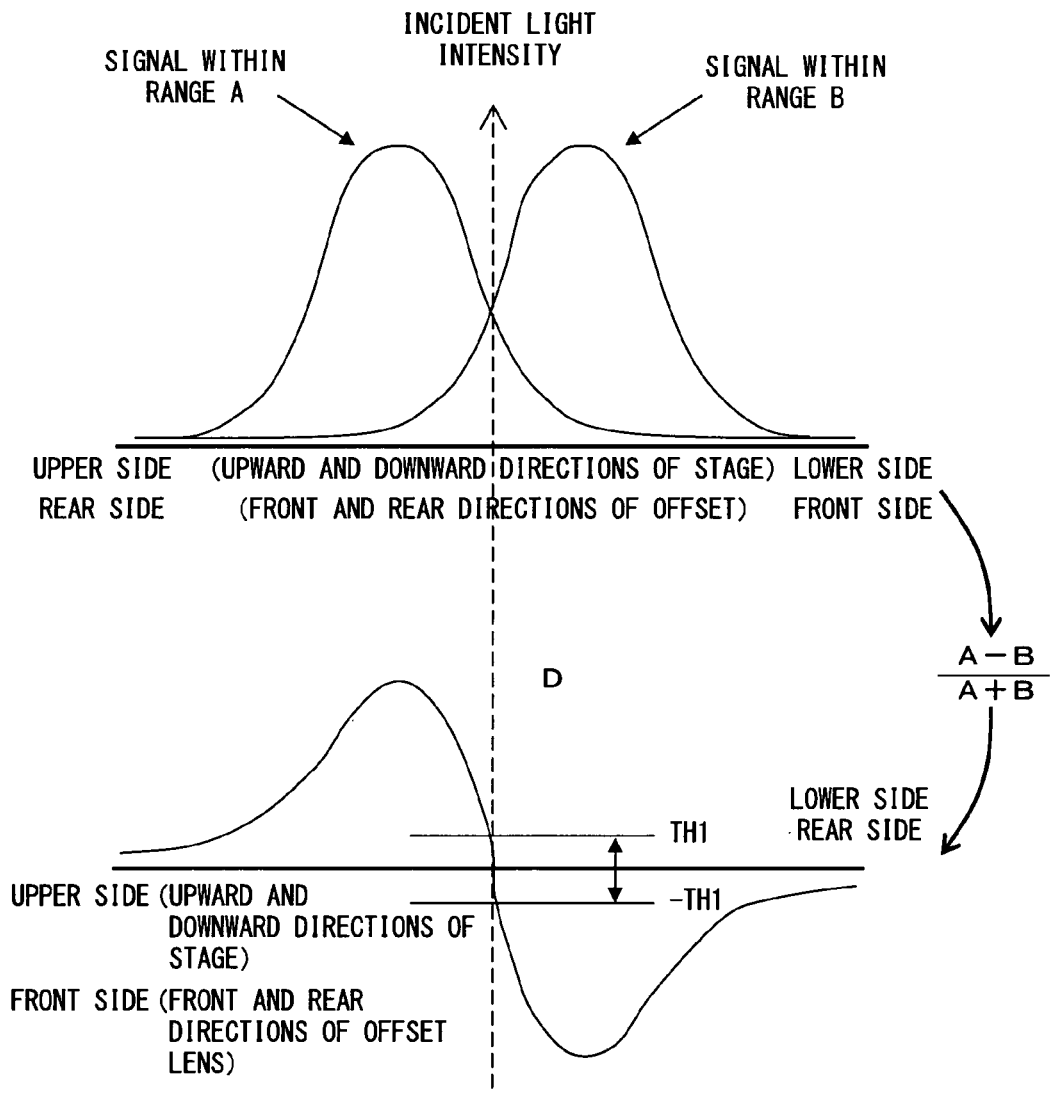
FIG. 7 shows the distribution of the intensity of the signals calculated from the detection signals in the first embodiment.

FIG. 7 shows the distribution of the intensity of the signals calculated from the above detection signals. The detection signals converted in the light receiving sensor 13 are divided by the signal processing unit 24 into ranges A and B shown in FIG. 5A through 5C and FIGS. 6A through 6C, and the sum of the intensity in each range is calculated.

Accordingly, when the horizontal axis is assumed to represent the upward and downward directions for the moving stage 1 (defocused) as shown in FIG. 6A, the signals that form the two curves A and B that are symmetric about the in-focus position are calculated. Also, when the position of the offset lens group 9 is assumed to be represented by the horizontal axis, the two curves A and B that are symmetric are similarly obtained.

These signals are input into the control unit 26. The control unit 26 calculates, from the input signals A and B, the signal that can be expressed by "$(A-B)/(A+B)$" shown in the lower graph in FIG. 7, and performs the focusing operation on the basis of this signal.

Specifically, the moment at which the inequality below is satisfied is determined to be the in-focus moment.

$$-TH1 < ((A-B)/(A+B)) < TH1$$

An example is explained in which the offset lens group 9 is moved to the place that is determined to be an "in-focus" position. When the value of the detected signal satisfies "((A−B)/(A+B))>TH1" at the moment of D in the graph, the control unit 26 instructs the aiming motor driving unit 21 to move the offset lens group 9 to the rear direction (right in FIG. 2), and repeats the determination of the detection signal of (A−B)/(A+B).

When the detected signal is within the above range, a motor stopping instruction is given to the aiming motor driving unit 21, and the focusing operation is terminated.

As described above, the lighting of laser light is controlled, and the reflected light of the laser flux that has been projected on the observation sample is detected; thereby, the active AF optical system is realized. The operations of a thusly configured device are explained by referring to the flowcharts in FIGS. 8 through 10.

Figure 8:
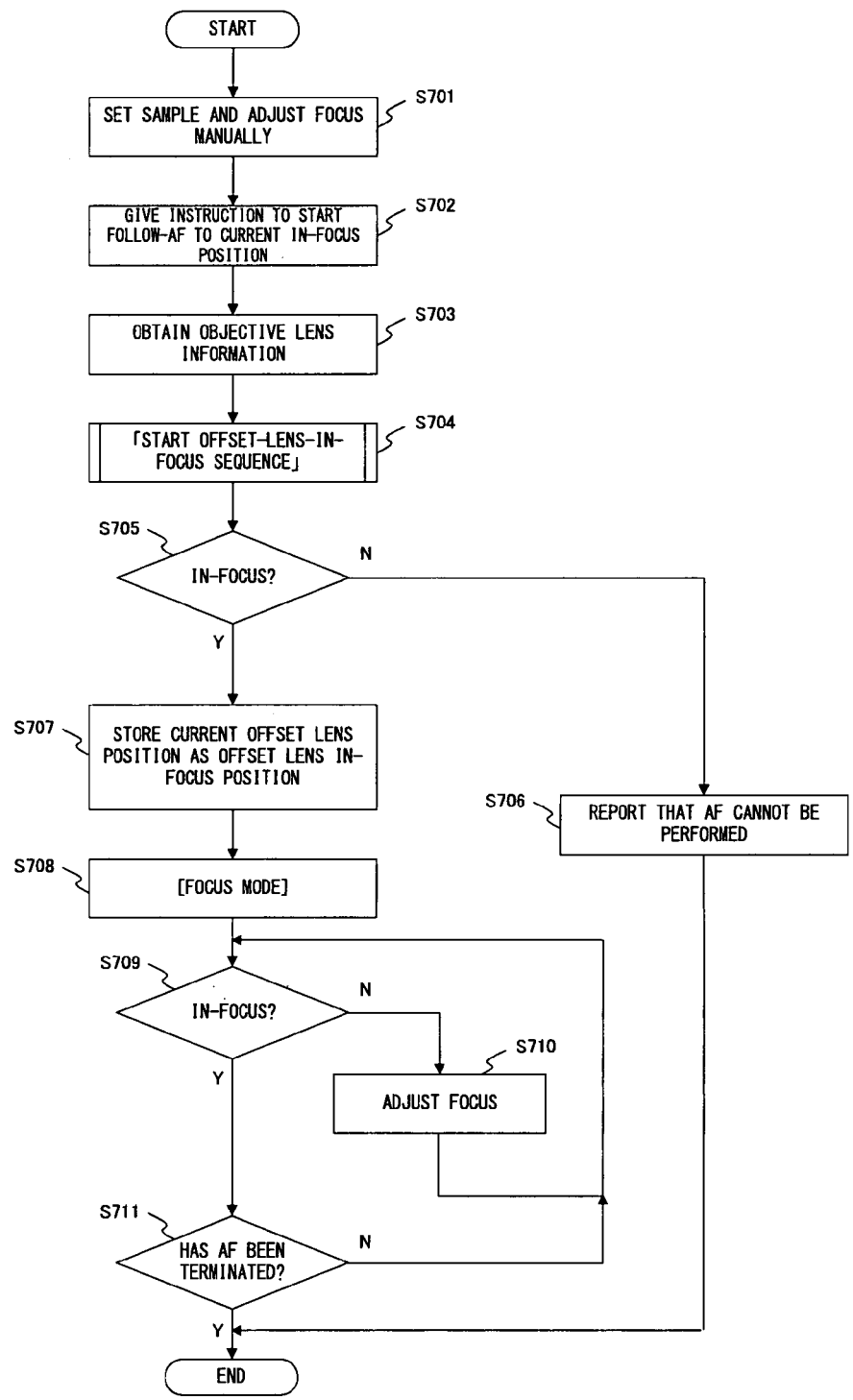
FIG. 8 shows a process flow for performing the AF on a position which an observation is being currently made in the first embodiment.

FIG. 8 shows a process flow for the AF device according to the present embodiment for performing the AF on the position at which the observation is being currently made. FIG. 8 (and FIG. 9) show the process that is executed when the "Follow-AF to current observation position" button 205 in FIG. 3 is pressed.

First, the user sets the observation sample S on the moving stage 1, and manually adjusts focus to the position for the observation (step 701; hereinafter, step is represented by "S").

The information on the objective lens 3 selected currently is obtained by detecting the revolver hole number of the objective lens 3 that is inserted into the optical path by using the revolver-hole-position detection unit 22.

Next, the user presses a "Follow-AF to current observation position" button on the external operation unit 25 in order to give the control unit 26 an instruction to start the follow-AF to the current in-focus position (S702). Then, in the control unit 26, the CPU 301 reads from the ROM 302 various pieces of parameter information for the AF control that is to be executed on the basis of the obtained objective lens information (S703). Then, an offset-lens-in-focus mode is started (S704).

The offset-lens-in-focus mode is a mode in which the offset lens group 9 is controlled to find, while maintaining the vertical position of the moving stage 1 (referred to as in-focus position), the position of the offset lens group 9 that is determined to be the "in-focus" position on the basis of the output from the light receiving sensor 13. Additionally, the outline of the offset-lens-in-focus mode is explained now, and a detailed explanation thereof will be given in FIG. 9.

The determination of the in-focus state in the offset-lens-in-focus mode is performed by the control unit 26. First, the control unit 26 reads, via the signal processing unit 24, the laser reflected light intensity detected by the light receiving sensor 13, and calculates (A−B)/(A+B) shown in FIG. 7.

Next, the control unit 26 determines whether or not the value of (A−B)/(A+B) is within the predetermined range. The threshold value used for this determination (here "TH1$_{of}$") is contained in the above mentioned AF parameter information, and is determined for each of the three types of objective lenses 3.

In the control unit 26, the case when "−TH1$_{of}$≦(A−B)/(A+B)≦TH1$_{of}$" is satisfied is determined to be "in-focus". When the case is not determined to be "in-focus" (No in S705), the control unit 26 determines whether or not the entirety of the operatable range of the offset lens group 9 has been searched for the in-focus position.

The "operatable range" consists of the limit values that are expressed in the form of the addresses of the positions between which the offset lens group 9 can operate. The limit values of the positions of the offset lens group 9 are equal to or below the mechanical limit position of the driving mechanism of the offset lens group 9. Hereinafter, the front mechanical limit position of the driving mechanism of the offset lens group 9 is referred to as the front limit, and the rear mechanical limit position of the driving mechanism of the offset lens group 9 is referred to as the rear limit.

If it is determined that the entirety of the operable range of the offset lens group 9 has been searched, it is recognized that the proper focus cannot be achieved at the current position. Accordingly, the control unit 26 reports to the user that the AF control cannot be performed (S706), and the AF operation is terminated.

As an example of the manner of the report to the user, it is possible to cause the display unit 202 of the control unit 26 to display a message expressing the contents of the report, or to make a beep sound to arouse the user's attention.

If it is determined that the entirety of the operable range of the offset lens group 9 has not been searched, the control unit 26 moves the offset lens group 9 in accordance with the value of (A−B)/(A+B), and again performs the above determination (S705). By repeating these steps, the offset lens group 9 is adjusted to the position that is determined to be the in-focus position.

When the proper focus is achieved by using the offset lens group 9 (Yes in S705), the control unit 26 controls the offset-lens-driving unit 35 in order to stop the offset lens group 9, and stores the current position address (S707). Specifically, the control unit 26 stores the current offset lens position (a variable named "CurrentOfPos") in the RAM 303 as the offset-lens-in-focus position (a variable named "LastofAFPos") together with the X, Y, and Z coordinates of the moving stage 1.

Thereafter, the control unit 26 switches to the focus mode (S708). In this focus mode, the so-called follow-AF is performed in which, while the position of the offset lens group 9 is maintained, the moving stage 1 is adjusted in the vertical directions so that the distance between the objective lens 3 and the observation sample S, i.e., the in-focus position at which the observation is currently being performed, is kept constant.

In the focus mode, first, it is determined whether or not the current state is the in-focus state (S709). The manner of this determination is the same as in S705, except that the threshold value used for the determination is held independently, and this threshold value is assumed to be TH1$_{st}$.

The AF parameter contains TH1$_{st}$ and TH1$_{of}$ similarly, and they are set for each type of the objective lenses. In S709, when the inequality of −TH1$_{st}$≦(A−B)/(A+B)≦TH1$_{st}$ is satisfied, the position is determined to be the in-focus position.

When the position is determined not to be the in-focus position (No in S709), the control unit 26 moves the moving stage 1 vertically in accordance with the value of (A−B)/(A+B); i.e., it adjusts focus (S710). Thereafter, the control unit 26 again performs the focus determination (S709). By repeating this, the moving stage 1 is automatically adjusted to the position determined to be the in-focus position (referred to as the follow mode).

This follow mode is continued until a termination instruction is given (until a "Cancel follow-AF" button 207 is pressed) by the user (S711). Additionally, by setting the threshold value to be smaller than the $TH1_{of}$ and $TH1_{st}$, it is determined that the proper focus is achieved, without adjusting focus, in the focus mode immediately after the determination of the proper focus in the offset-lens-in-focus mode. Accordingly, it is possible to complete the AF within the time taken for the offset-lens focusing.

Figure 9:
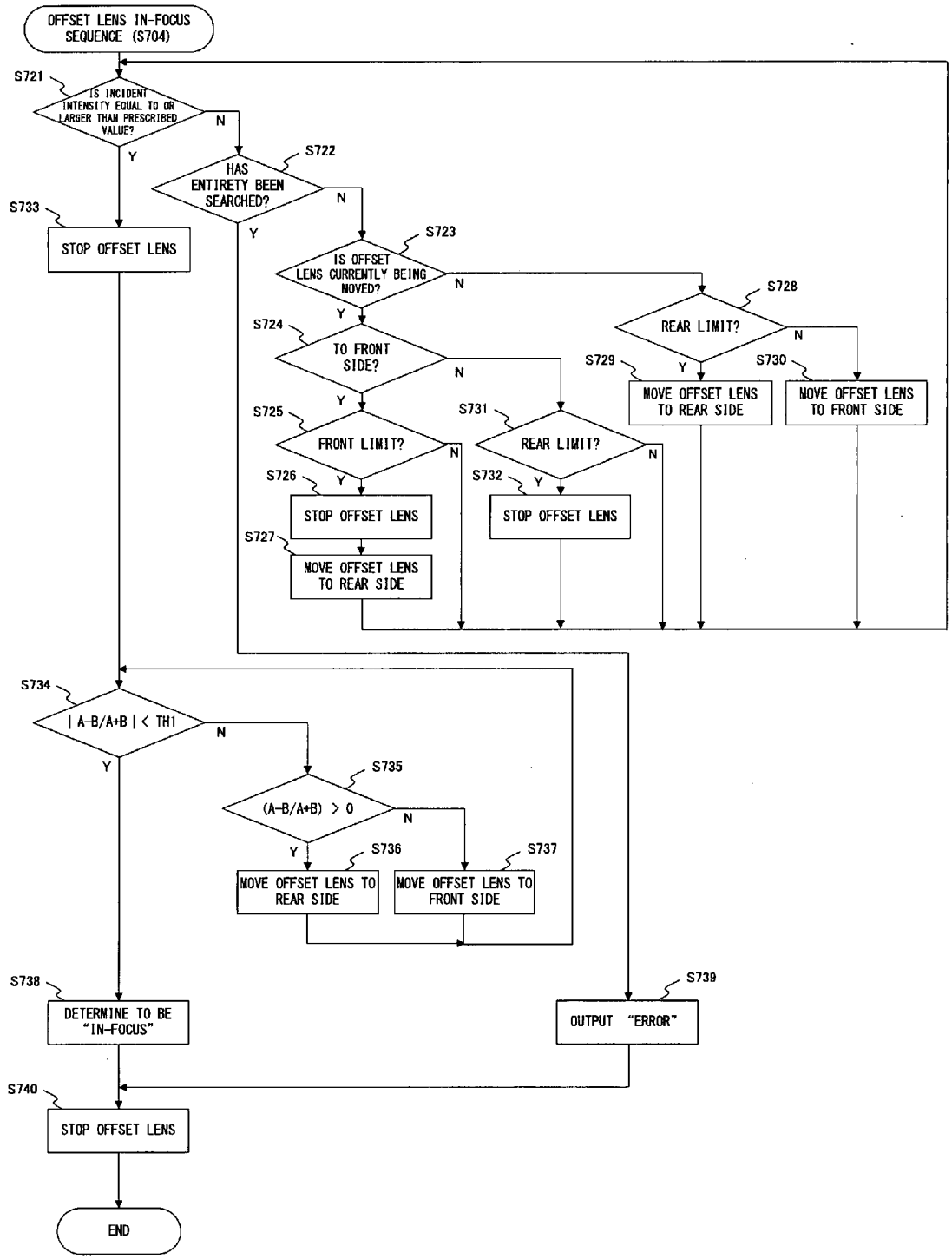
FIG. 9 shows in detail the offset-lens-in-focus mode (S704 and S705) shown in FIG. 8.

FIG. 9 shows in detail the offset-lens-in-focus mode (S704 and S705) shown in FIG. 8. First, the control unit 26 determines whether or not the incident intensity of the laser beam incident on the light receiving sensor 13 is equal to or larger than the prescribed value (S721).

When the incident intensity of the laser beam incident on the light receiving sensor 13 is equal to or smaller than the prescribed value (No in S721), the control unit 26 controls the external operation unit 25 to move the offset lens group 9, and starts a control in order to find the position at which the incident intensity of the beam incident on the light receiving sensor 13 is equal to or larger than the prescribed value.

Next, the control unit 26 determines whether or not the entirety of the operable range of the offset lens group 9 has been searched (S722). If it is determined that the entirety of the operable range of the offset lens group 9 has been searched (Yes in S722), the control unit 26 recognizes that the proper focus cannot be achieved, outputs an "error" (S739), and stops the offset lens group 9. Thereafter, this process flow is terminated.

When the entirety of the operable range of the offset lens has not been searched (No in S722), the control unit 26 determines whether or not the offset lens 9 is currently being moved (S723). If the offset lens is not currently being moved (No in S723), the control unit 26 determines whether or not the position of the offset lens is at the front limit (S728).

When the position of the offset lens is at the front limit (Yes in S728), the control unit 26 starts to move the offset lens group 9 to the rear side (S729). When the position of the offset lens group 9 is not at the front limit (No in S728), the control unit 26 moves the offset lens group 9 to the front side (S730).

When it is determined that the position of the offset lens is at the front limit in S728, the control unit 26 sets a limit-reached flag, and writes to the RAM 303 the history that the position of the offset lens has reached the front limit in the in-focus sequence.

When it is determined that the offset lens group 9 is being moved in S723 (Yes in S723), the control unit 26 determines whether the moving direction is to the front side or not (S724). If it is determined that the offset lens group 9 is being moved to the front side (Yes in S724), the control unit 26 determines whether or not the offset lens group 9 has reached the front limit (S725).

If it is determined that the offset lens group 9 has not reached the front limit (No in S725), the control unit 26 again executes process in S721, and checks the intensity of the incident beam.

If it is determined that the offset lens group 9 has reached the front limit (Yes in S725), the control unit 26 stops the offset lens group 9 (S726), and moves the offset lens group 9 to the rear side (S727).

If it is determined that the offset lens group 9 is being moved to the rear side (No in S724), the control unit 26 determines whether or not the offset lens group 9 has reached the rear limit (S731). If the offset lens group 9 has reached the rear limit (Yes in S731), the control unit 26 controls the offset-lens-driving unit 35 and stops the offset lens group 9 (S732).

Additionally, when it is determined in S725 and S731 that the offset lens 9 has reached the limit, the control unit 26 sets a limit-reached flag similarly to the case in S728. When the incident intensity is equal to or larger than the prescribed value in S721 (Yes in s721), the control unit 26 controls the offset-lens-driving unit 35 and stops the offset lens group 9 (S733). Thereafter, the determination based on the signal (A−B)/(A+B) shown in the lower graph in FIG. 7 is performed (S734).

First, the control unit 26 determines whether or not the absolute value of (A−B)/(A+B) is greater than the prescribed value TH1 (shown in the lower graph in FIG. 7) (S734). When the determination result of this S734 is Yes, it is determined that the proper focus has been achieved in the offset-lens-in-focus sequence (S738). Thereafter, the control unit 26 stops the offset lens group 9 (S740) and terminates the process.

When the absolute value of (A−B)/(A+B) is greater than TH1, it is recognized that the current position is away from the in-focus position, and the control unit 26 switches to a sequence in which the position of the offset lens is adjusted so that the absolute value becomes smaller than TH1 (No in step S734).

Then, the control unit 26 determines whether the value of (A−B)/(A+B) is positive or negative (S735). When the value of (A−B)/(A+B) is positive (Yes in S735), the control unit 26 moves the offset lens group 9 to the rear side (S736). When the value of (A−B)/(A+B) is negative (No in S735), the control unit 26 moves the offset lens group 9 to the front side (S737).

By repeating the processes of S735 through S737, the control unit 26 performs adjustment so that the offset lens is moved to the position at which the above absolute value is smaller than TH1 in S734.

Figure 10:
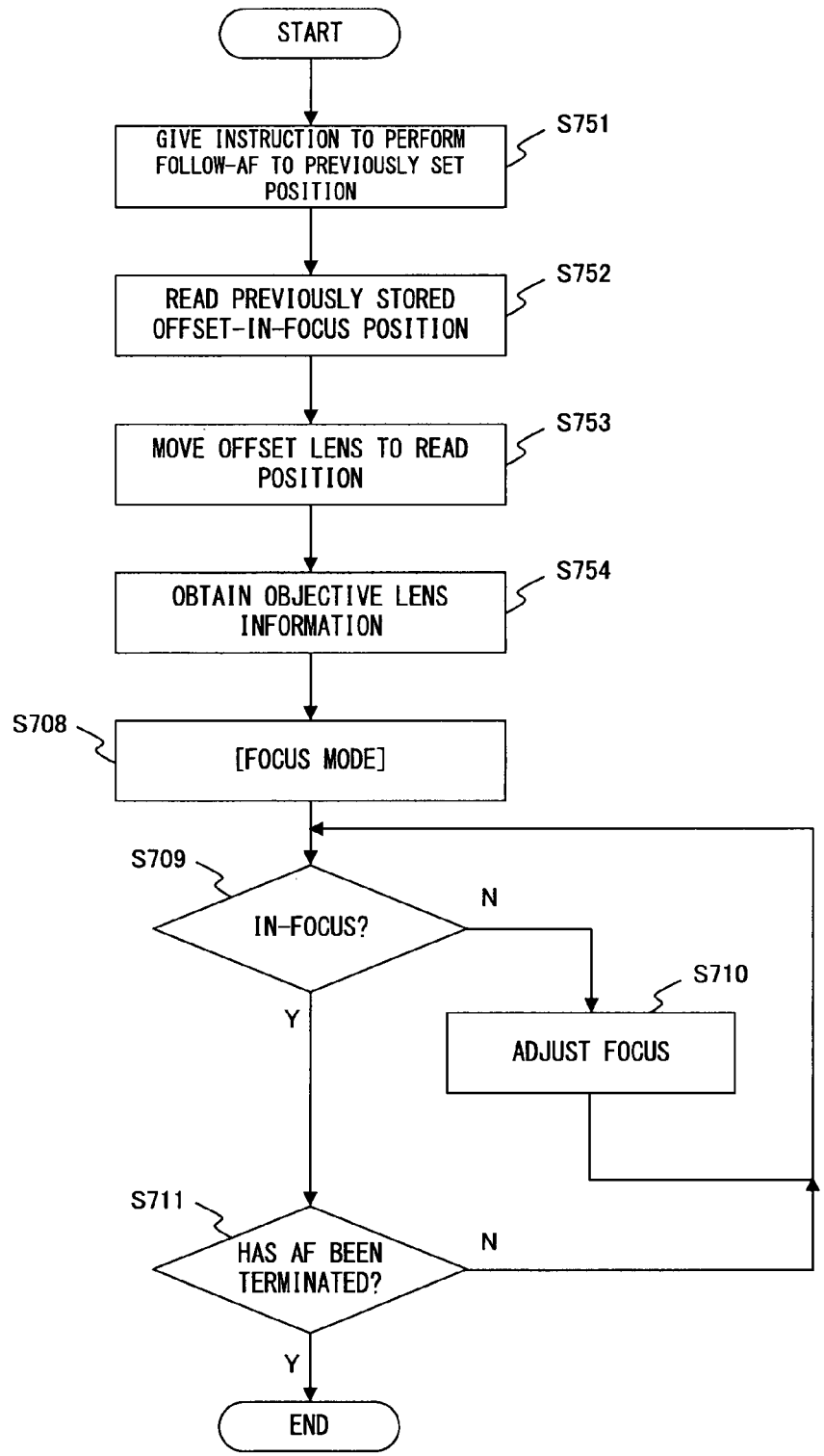
FIG. 10 shows a process flow for performing the AF on the position that was previously set in the first embodiment.

FIG. 10 shows a flowchart for performing the AF for the position set previously in the AF device according to the present embodiment. The steps shown in FIG. 10 are executed when the "Follow-AF to previously set position" button 206 shown in FIG. 3 is pressed.

First, the user presses the "Follow-AF to previously set position" on the external operation unit 25 in order to give to the control unit 26 an instruction to perform the follow-AF to the position that was previously set (S751).

The control unit 26, having received this AF instruction, reads from the RAM 303 the offset-in-focus position (LastOfAFPos) that was previously stored, and sets the variable "SetAFPos" to the read variable "LastOfAFPos" (S752).

The control unit 26 controls the offset-lens-driving unit 35 in order to move the offset lens group 9 to the position at which the above reading was performed (variable named "SetAFPos") (S753). Then, the control unit 26 obtains objective lens information by using the revolver-hole-position detection unit 22 (S754).

The subsequent processes are the same as those subsequent to S708 in FIG. 8 in the first embodiment; thus the explanation thereof will be omitted.

In the AF device configured as above, it is possible for users to perform the follow-AF accurately to a point of interest with only one operation, without adjusting focus manually in the case when users desire to make an observation while maintaining the in-focus position.

Additionally, the explanation is given on the assumption that the various instructions are input through the external operation unit 25. However, it is also possible to employ a configuration in which operation buttons and JOG dials are arranged on the body of the microscope to receive users' instructions.

It is also possible to employ a configuration in which an external interface is added to the control unit 26 such that the control unit 26 can be connected to a personal computer and the instructions given by means of application software installed on the computer.

Also, in the present embodiment, it is assumed that the AF parameter information is stored in the ROM 302 in the control unit 26, however, it is also possible to overwrite the AF parameter information from the external operation unit 25, a PC, or the like.

Figure 11:
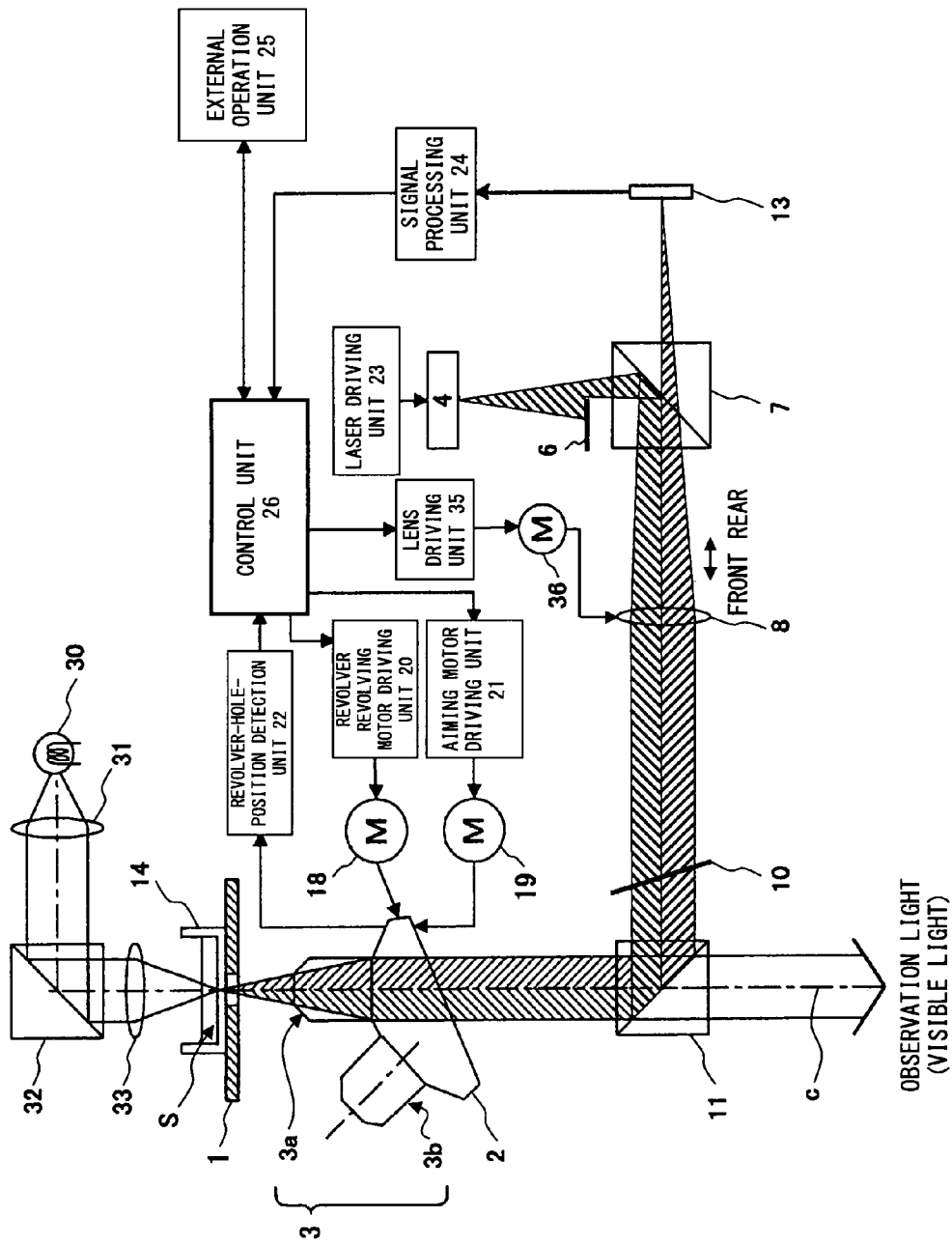
FIG. 11 shows a variation example of FIG. 2.

Also, in the present embodiment, a configuration is employed in which an intermediate image of the laser light source is formed in the AF optical system. However, it is also possible to employ a configuration in which the intermediate image is not formed as shown in FIG. 11, which is a variation of FIG. 2, and the condensing lens group 8 is moved instead of the offset lens group 9.

Next, a sequence will be explained by referring to FIGS. 12 and 13, in which a state of the microscope is stored in an arbitrary timing and the microscope is returned to the stored state after a substantial time has elapsed.

Figure 12:
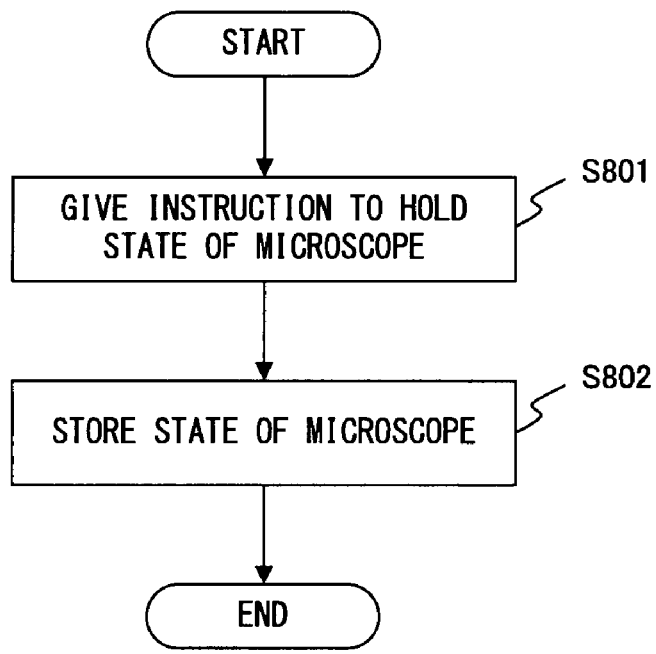
FIG. 12 shows a process flow for storing a state of the microscope at an arbitrary timing in the first embodiment.

FIG. 12 shows a process flow according to the present embodiment of storing a state of the microscope at an arbitrary timing. When the user presses a prescribed button on the external operation unit 25 at an arbitrary time, an instruction to hold the state of the microscope is given (S801).

Then, the control unit 26 stores in the RAM 303 the state of the microscope at the time at which the button was pressed (S802). The state of the microscope is setting information on the microscope at that time such as the type of objective lens 3 that is inserted into the optical axis, the aimed position (Z position), the quantity of luminous light, the observation methods (filter position), the XY stage position, the position of the offset lens, and the like.

Also, a plurality of states of the microscope can be stored. By, for example, assigning numbers unique to respective states of the microscope, it is possible to store a plurality of states of the microscope.

Figure 13:
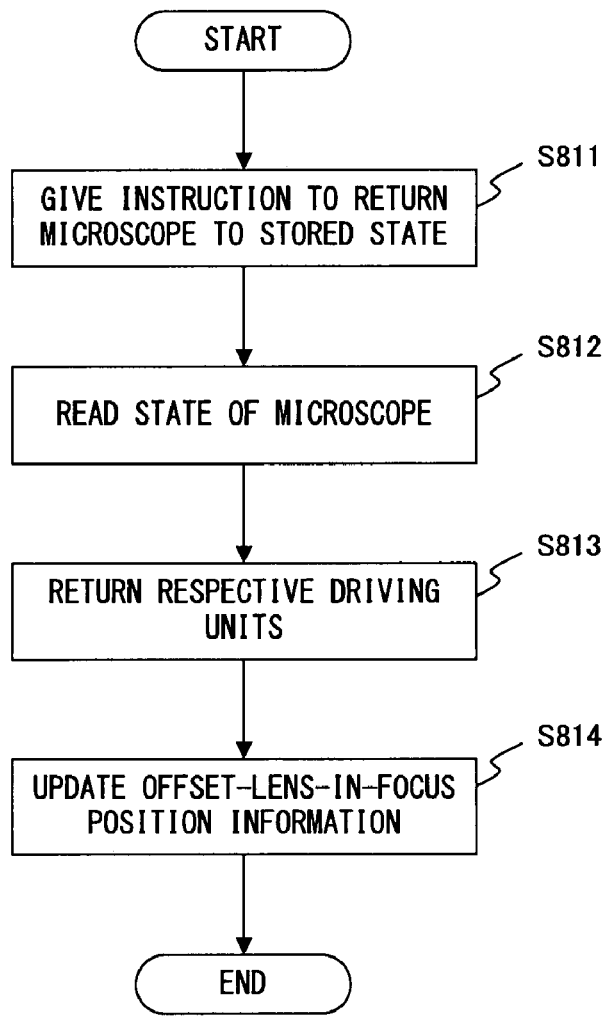
FIG. 13 shows a process flow for returning the microscope to the stored state in the first embodiment.

FIG. 13 shows a process flow, in the present embodiment, of returning the microscope to the stored state. When the user presses a prescribed button on the external operation unit 25, an instruction to return the microscope to the stored state is given (S811). For example, by selecting the state number, the user can select which of the stored states the microscope is to be returned to.

Then, the control unit 26 reads from the ROM 303 the state of the microscope (the setting information on the microscope stored at the time the button was pressed in FIG. 12, such as the aimed position [Z position], the quantity of luminous light, the observation methods [filter position], the XY stage position, the position of the offset lens, and the like) (S812).

The control unit 26 returns the microscope to the stored state by resetting the respective driving units on the basis of the information read in the above step (S813).

Then, the control unit 26 updates the offset-lens-in-focus position information (S814). Specifically, the variable "LastOfAFPos" is set to the current (after returning) offset lens position (a variable named "CurrentOfPos").

Because the offset-lens-in-focus position (LastOfAFPos) has been updated in S814, if the steps in FIG. 10 are executed in this state, the follow-AF is performed on the in-focus position obtained when the follow-AF was performed in the previous storing of the state of the microscope.

According to the AF device in the present embodiment, it is possible to allow manual adjustment of focus on the position at which the user desires to have an observation, to automatically adjust the offset lens position in order to move it to the position determined to be the in-focus position in the focus determination performed by the AF sensor, and to switch to the follow-AF mode.

Thereby, the operability of setting the AF position improves, and users can arbitrarily set the observation positions without performing complicated setting in the AF device, which permits real-time AF in which the proper focus is always achieved on a prescribed position on the sample.

Second Embodiment

The salient feature of an AF device according to the present embodiment lies in the fact that a microscope observation image according to the first embodiment is picked up by an image pick-up unit such as a CCD or the like, and the commonly known video AF is performed on the picked up image so that the manual adjustment of focus is not required.

FIG. 14 shows the entire configuration of the AF device for microscopes according to the present embodiment. The same constituents as in the first embodiment are denoted by the same numerals, and the explanation thereof is omitted.

The beams, which are the observation luminous light emitted from the light source 30, are transmitted through the observation sample S, and are incident on the objective lens 3. The observation beams that have become parallel to each other by passing through the objective lens 3 form an image on a CCD 40 after passing through an image forming lens 50. The observation beams that have formed an image are detected as image signals by an image detection unit 41, and are transferred to a signal processing unit 42.

The signal processing unit 42 calculates the contrast value and the luminance value of the image signal, and transfers the calculated values to the control unit 26. The control unit 26 determines whether or not the current position is the in-focus position on the basis of the result of the signal processing. When it is determined that the current position is not the in-focus position, the control unit 26 controls the aiming motor driving unit 21 in order to move the focused position to a position that can be determined to be the in-focus position on the basis of the result of the signal processing.

The series of the above steps are called the video AF, and are a commonly known technique; therefore, the explanation thereof will be omitted.

Figure 15:
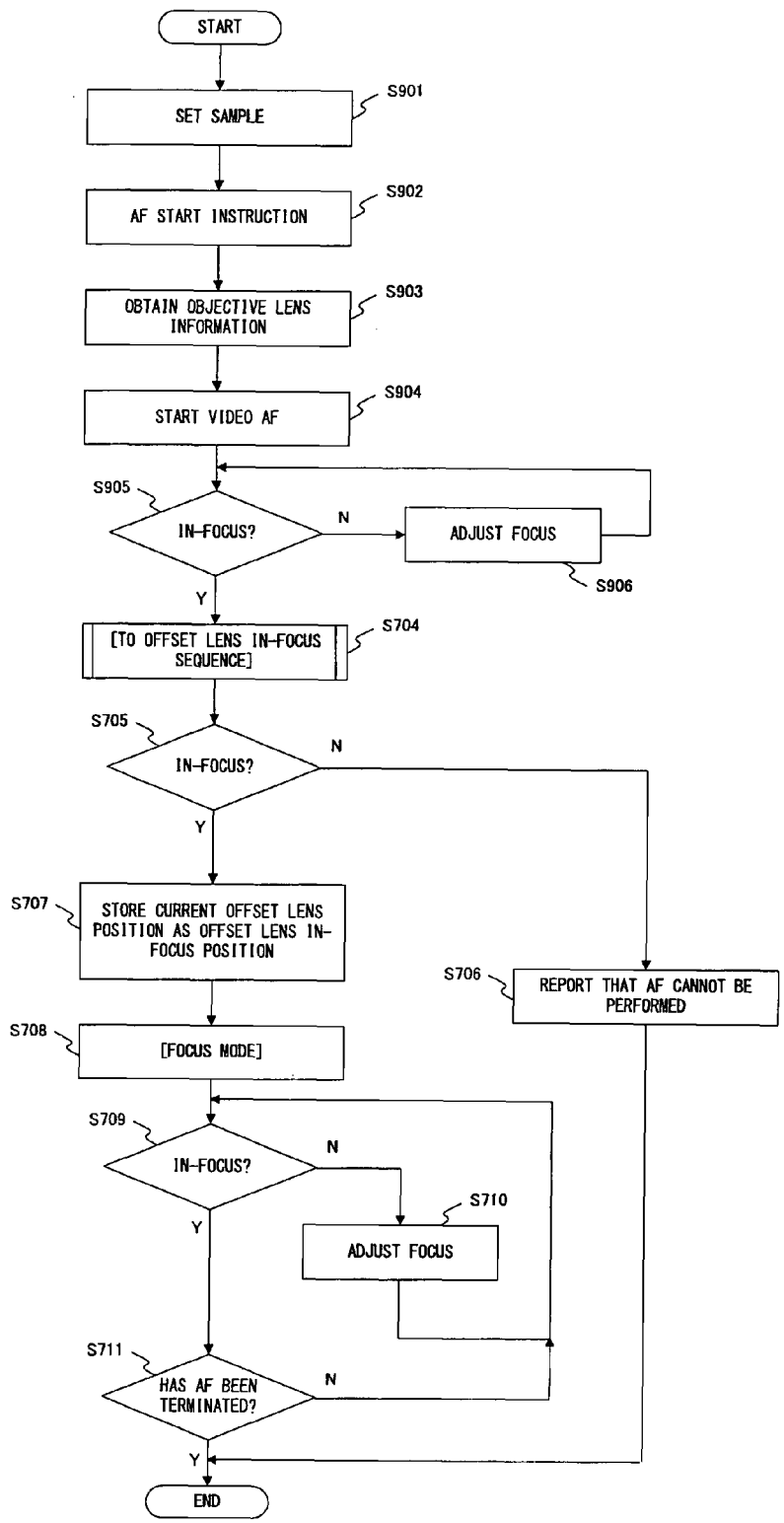
FIG. 15 shows a process flow for the operations executed before the follow-AF is performed in the AF device in the second embodiment.

FIG. 15 shows a process flow for the operations executed before the follow-AF is performed in the AF device according to the present embodiment. First, the user sets the observation sample S on the moving stage 1 (S901) and gives a follow-AF execution instruction to the control unit 26 via the external operation unit 25 (S902).

When receiving the follow-AF execution instruction, the control unit 26 obtains the objective lens information by using the revolver-hole-position detection unit 22 (S903).

Then, the control unit 26 switches to the video AF mode (S904). The control unit 26 determines whether or not the current position is the in-focus position on the basis of the data obtained from the signal processing unit 42 (S905).

In 905, when it is determined that the current position is not the in-focus position (No in S905), the control unit 26 controls the aiming motor driving unit 21 and adjusts focus until the current position is determined to be the in-focus position (S906).

When the current position is determined to be the in-focus position (Yes in S905), the control unit 26 stops the aiming motor 19 by using the aiming motor driving unit 21, and switches to the offset-lens-in-focus mode (S907).

The subsequent steps are the same as those subsequent to S704 in the flowchart of FIGS. 8 and 9 in the first embodiment; accordingly, the explanation thereof will be omitted.

In the AF device configured as above, it is possible to realize the accurate follow-AF to the point of interest with only one operation, instead of requiring the user to manually adjust the focus to the point of interest when he or she desires to observe the sample while maintaining the in-focus position.

Figure 16:
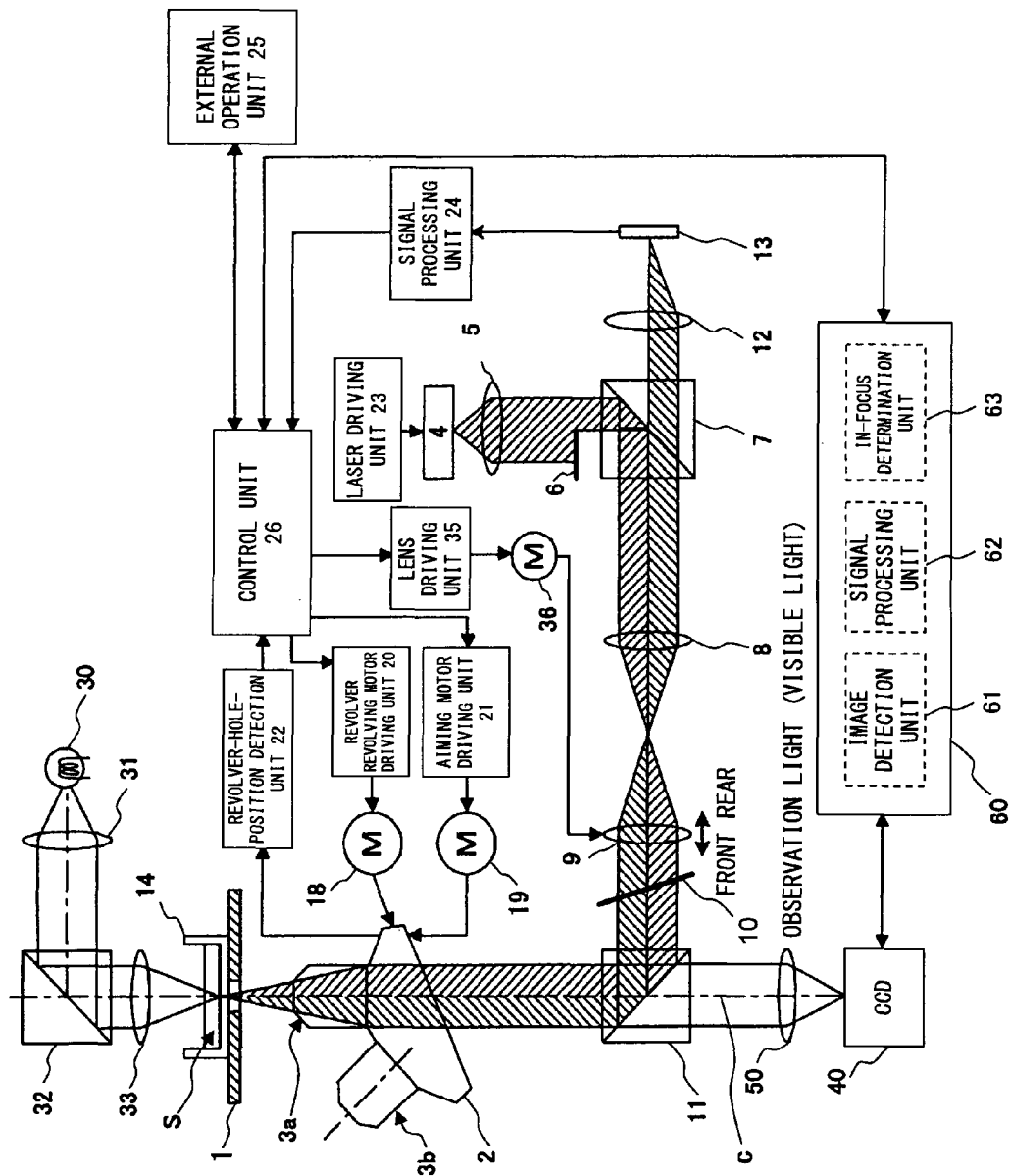
FIG. 16 shows the entire configuration of the microscope system, in which the processes of an image detection unit 41 and a signal processing unit 42 are executed by a personal computer 60 in the second embodiment.

FIG. 16 shows the entire configuration of the microscope system in which the processes of the image detection unit 41 and the signal processing unit 42 are executed by a personal computer 60. The personal computer 60 comprises, in addition to an image detection unit 61 and a signal processing unit 62, an in-focus determination unit 63 by which it is determined whether or not the current position is the in-focus position. This in-focus determination is performed by using the above video AF.

The personal computer 60 can be connected to the control unit 26 via a communication I/F such as a serial port, the IEEE1394, a LAN, or the like. The personal computer 60 sends to the control unit 26 an instruction to drive the aiming operation on the basis of the determination result of the in-focus determination unit 63, and repeats this process until the current position is determined to be the in-focus position. When the current position is determined to be the in-focus position, the control unit 26 is notified of the completion of the video AF so that the control unit 26 can recognize the completion of the video AF.

According to the AF device of the present embodiment, it is possible to execute the video AF and to start the follow-AF after automatically adjusting the offset lens (in other words, it is possible to perform the follow-AF to the position at which the user desires to make an observation with only one operation).

In the above explanations, an AF device that is integrated with the microscope is used as an example of an AF device according to the present embodiment; however, the scope of the present invention is not limited to this example. The AF device according to the present embodiment may be an AF device that is configured to be independent from a microscope and that comprises, as its constituents, the driving unit (aiming motor 19 and aiming motor driving unit 21), the light casting unit (reference light source), the detection unit (the light receiving sensor), the projection state changing unit (offset lens), the in-focus state determination unit (control unit 26), and the in-focus state adjustment unit (control unit 26).

In the above, the embodiments of the present invention have been explained. However, the scope of the present invention is not limited to any one of the above embodiments, and various alterations and modifications are allowed without departing from the spirit of the present invention.

According to the present invention, the process flow for performing the follow-AF to the in-focus position at which the user desires to make an observation can be made to be easier than in Japanese Patent Application Publication No. 2002-341234. Also, because the focus in the observation image while the AF control is being performed is excellent. Further, by performing the step-driving method on the offset lens, the position of the offset lens can be determined in a shorter time than when the AF process is performed on the state for each offset lens position.

According to the present invention, a user can easily adjust focus to the in-focus position at which the user desires to make an observation, and can make the observation by means of the follow-AF in a stress-free manner.

Accordingly, by utilizing the present invention, it is possible to perform real-time follow-AF to the point of interest by only requiring a user to determine the in-focus position at which the user desires to make an observation.

What is claimed is:

1. An autofocus device, comprising:
   a stage on which a sample is mountable;
   an objective lens arranged opposite to the sample mounted on the stage;
   a focusing unit which drives at least one of the stage and the objective lens in an optical axis direction in order to control positions of the stage and the objective lens relative to each other;
   a lighting unit which casts light for focusing onto the sample via the objective lens;
   a detection unit which detects an optical image formed by light that was cast by the lighting unit and reflected from the sample via the objective lens;
   a projection state changing unit which includes a lens that is provided in an optical path from the lighting unit to the detection unit, wherein the projection state changing unit is configured to change a state of the optical image projected onto the detection unit;
   a first in-focus state determination unit which determines an in-focus state of the sample based on a detection result obtained from the detection unit; and
   a first in-focus state adjustment unit which controls the projection state changing unit, while the stage and the objective lens are held at prescribed positions under control of the focusing unit, to: (i) search for a position of the projection state changing unit by moving the projection state changing unit, wherein the position is determined to be the in-focus state by the first in-focus state determination unit, and (ii) fix the projection state changing unit at the position determined to be the in-focus state by the first in-focus state determination unit,
   wherein after fixing the projection state changing unit at the position determined to be the in-focus state by the first in-focus state determination unit, when a position is determined not to be the in-focus state by the first in-focus state determination unit, the first in-focus state adjustment unit further controls the focusing unit, while the fixed position of the projection state changing unit is held, to drive at least one of the stage and the objective lens in the optical axis direction to consistently keep a constant distance between the objective lens and the sample mounted on the stage, such that the position is determined to be the in-focus state by the first in-focus state determination unit, and
   wherein the autofocus device further comprises:
      a storage unit which stores information on the position of the projection state changing unit that has been adjusted by the first in-focus state adjustment unit; and
      a return control unit which causes the projection state changing unit to return to said position based on the information on the position of the projection state changing unit stored in the storage unit.

2. The autofocus device according to claim 1, further comprising:
   an illuminating unit which emits light for observation onto the sample;
   an image pick-up unit which picks up an observation image of the sample;
   a second in-focus state determination unit which determines an in-focus state of the sample based on an output of the image pick-up unit; and a second in-focus state adjustment unit which adjusts positions of the stage and the objective lens to positions that are determined by the second in-focus state determination unit to be in-focus positions.

3. A microscope system including the autofocus device according to claim 1.

4. The autofocus device according to claim 1, wherein the projection state changing unit further includes a driving unit which moves the lens of the projection state changing unit in the optical axis direction.

5. The autofocus device according to claim 2, wherein the second in-focus state determination unit determines focus based on a contrast value of the observation image.

6. An autofocus device, comprising:
a stage on which a sample is mountable;
an objective lens arranged opposite to the sample mountable on the stage;
a focusing unit which drives at least one of the stage and the objective lens in an optical axis direction in order to control positions of the stage and the objective lens relative to each other;
a lighting unit which casts light used for focusing onto the sample via the objective lens;
a detection unit which detects an optical image formed by light that was cast by the lighting unit and reflected from the sample via the objective lens;
a projection state changing unit which includes a lens that is provided in an optical path from the lighting unit to the detection unit, wherein the projection state changing unit is configured to change a state of the optical image projected onto the detection unit; and
a control unit which controls the focusing unit based on a detection result of the detection unit,
wherein the control unit also controls the projection state changing unit, while the stage and the objective lens are held at prescribed positions under control of the focusing unit, to:
(i) search for a position of the projection state changing unit by moving the projection state changing unit to detect an in-focus state by using the detection unit, and (ii) fix the projection state changing unit at the position detected to be the in-focus state,
wherein after fixing the projection state changing unit at the position detected to be the in-focus state, when a position is detected not to be the in-focus state, the control unit further controls the focusing unit, while the fixed position of the projection state changing unit is held, to move at least one of the stage and the objective lens in the optical axis direction to consistently keep a constant distance between the objective lens and the sample mounted on the stage, such that the position is detected to be the in-focus state, and
wherein the auto focus device further comprises:
a storage unit which stores information on the position of the projection state changing unit that has been adjusted by the control unit; and
a return control unit which causes the projection state changing unit to return to said position based on the information on the position of the projection state changing unit stored in the storage unit.

7. A microscope system including the autofocus device according to claim 6.

8. A method of controlling an autofocus device which comprises:
a stage on which a sample is mountable;
an objective lens arranged opposite to the sample mountable on the stage;
a focusing unit which drives at least one of the stage and the objective lens in an optical axis direction in order to control positions of the stage and the objective lens relative to each other;
a lighting unit which casts light for focusing onto the sample via the objective lens;
a detection unit which detects an optical image formed by light that was cast by the lighting unit and reflected from the sample via the objective lens;
a projection state changing unit which includes a lens that is provided in an optical path from the lighting unit to the detection unit, wherein the projection state changing unit is configured to change a state of the optical image projected onto the detection unit;
an in-focus state determination unit which determines an in-focus state of the sample based on a detection result obtained from the detection unit; and
an in-focus state adjustment unit which controls the focusing unit and the projection state changing unit based on a determination result obtained by the in-focus state determination unit, and which adjusts to the in-focus state with respect to the sample, wherein the method comprises:
operating the focusing unit to hold the stage and the objective lens at prescribed positions;
controlling the projection state changing unit, while the stage and the objective lens are held at the prescribed positions, to: (i) search for a position of the projection state changing unit by moving the projection state changing unit, wherein the position is determined to be the in-focus state by the in-focus state determination unit, and (ii) fix the projection state changing unit at the position determined to be the in-focus state by the in-focus state determination unit;
after fixing the projection state changing unit at the position determined to be the in-focus state by the in-focus state determination unit, when a position is determined not to be the in-focus state by the in-focus state determination unit, controlling the focusing unit, while the fixed position of the projection state changing unit is held, to drive at least one of the stage and the objective lens in the optical axis direction to consistently keep a constant distance between the objective lens and the sample mounted on the stage, such that the position is determined to be the in-focus state by the in-focus state determination unit;
storing information on the fixed position of the projection state changing unit; and
causing the projection state changing unit to return to said position based on the stored information.

9. An autofocus device, comprising:
a stage on which a sample is mountable;
an objective lens arranged opposite to the sample mountable on the stage;
focusing means for driving at least one of the stage and the objective lens in an optical axis direction in order to control positions of the stage and the objective lens relative to each other;
lighting means for casting light for focusing onto the sample via the objective lens;
detection means for detecting an optical image formed by light that was cast by the lighting means and reflected from the sample via the objective lens;
projection state changing means for changing a state of the optical image projected onto the detection means, wherein the projection state changing means includes a lens which is provided in an optical path from the lighting means to the detection means;

first in-focus state determination means for determining an in-focus state of the sample based on a detection result obtained from the detection means; and first in-focus state adjustment means for controlling the projection state changing means, while the stage and the objective lens are held at prescribed positions under control of the focusing means, to: (i) search for a position of the projection state changing means by moving the projection state changing means, wherein the position is determined to be the in-focus state by the first in-focus state determination means, and (ii) fix the projecting state changing means at the position determined to be the in-focus state by the first in-focus state determination means, wherein after fixing the projection state changing means at the position determined to be the in-focus state by the first in-focus state determination means, when a position is determined not to be the in-focus state by the first in-focus state determination means, the first in-focus state adjustment means further controls the focusing means, while the fixed position of the projection state changing means is held, to drive at least one of the stage and the objective lens in the optical axis direction to consistently keep a constant distance between the objective lens and the sample mounted on the stage, such that the position is determined to be the in-focus state by the first in-focus state determination means, and wherein the autofocus device further comprises:

storage means for storing information on the position of the projection state changing means that has been adjusted by the first in-focus state adjustment means; and return control means which causes the projection state changing means to return to said position based on the information on the position of the projection state changing means stored in the storage means.

\* \* \* \* \*